(12) United States Patent
Blythe

(10) Patent No.: US 8,756,282 B2
(45) Date of Patent: Jun. 17, 2014

(54) INTERPERSONAL COMMUNICATION ENHANCER

(75) Inventor: Simon Blythe, Ely (GB)

(73) Assignee: MasterCard International Incorporated, Purchase, NY (US)

( * ) Notice: Subject to any disclaimer, the term of this patent is extended or adjusted under 35 U.S.C. 154(b) by 707 days.

(21) Appl. No.: 11/942,067

(22) Filed: Nov. 19, 2007

(65) Prior Publication Data

US 2009/0132706 A1 May 21, 2009

(51) Int. Cl.
*G06F 15/16* (2006.01)
(52) U.S. Cl.
USPC .......... 709/206; 709/227; 709/237; 705/7.14; 705/67
(58) Field of Classification Search
USPC .................................. 709/227–229
See application file for complete search history.

(56) References Cited

U.S. PATENT DOCUMENTS

| | | | |
|---|---|---|---|
| 4,677,657 A | 6/1987 | Nagata et al. | |
| 6,594,361 B1 | 7/2003 | Chaney et al. | |
| 7,069,438 B2 | 6/2006 | Balabine et al. | |
| 7,260,727 B2 | 8/2007 | Fougeroux et al. | |
| 7,260,847 B2 | 8/2007 | Sobel et al. | |
| 7,263,507 B1 | 8/2007 | Brake, Jr. et al. | |
| 2005/0233743 A1* | 10/2005 | Karaoguz et al. | 455/432.3 |
| 2007/0012763 A1 | 1/2007 | Van de Velde et al. | |
| 2007/0131761 A1 | 6/2007 | Smets et al. | |
| 2008/0097822 A1* | 4/2008 | Schigel et al. | 705/10 |

* cited by examiner

*Primary Examiner* — Jackie Zuniga Abad
(74) *Attorney, Agent, or Firm* — Hoffmann & Baron, LLP

(57) ABSTRACT

A system for enhancing interpersonal communication is disclosed. The system includes one or more personal computer devices capable of broadcasting and receiving select messages based on overlapping user interests. The device shares identity credentials with other devices to ensure credibility of the information being broadcast and maintains user interests in a portable secure database on the device.

17 Claims, 4 Drawing Sheets

INTERPERSONAL COMMUNICATION ENHANCER

BACKGROUND OF THE INVENTION

1. Field of the Invention

The present invention generally relates to communication systems, and more particularly to communication between interpersonal communication devices.

2. Brief Description of the Related Art

Today, a wide variety of network technologies are available to communicate information. For example, Bluetooth technology is an industrial specification for wireless personal area networks (PANs). Bluetooth technology provides personal devices, such as mobile phones, laptops, PCs, printers, digital cameras, and video game consoles, a way to connect and exchange information over an unlicensed short-range radio frequency. The devices typically do not have to be in line of sight of each other to exchange information as long as the transmission signals are strong enough.

WiFi is another network technology that enables personal devices, such as a PC, game console, cell phone, MP3 player or PDA, to connect to the Internet when the devices are within range of a wireless network connected to the Internet. The area covered by one or more interconnected access points is known as a hotspot. The range covered by hotspots can be as small as a single room with wireless-opaque walls or as much as many square miles covered by overlapping access points.

Although these technologies are utilized in personal devices, the devices and technology are rarely used to interact with other personal device users in a meaningful or useful way. For example, areas of common interest among personal device users are not commonly communicated electronically to one another. Accordingly, there exists a need to facilitate and enhance communication between personal communication device users.

SUMMARY OF THE INVENTION

A system for enhancing interpersonal communication is disclosed. The system includes one or more personal computer devices capable of broadcasting and receiving select messages based on overlapping user interests. The device shares identity credentials with other devices to ensure credibility of the information being broadcast and maintains user interests in a portable secure database on the device.

Various aspects of the system relate to broadcasting common user interests and verifying the credibility of information transmitted. For example, according to one aspect, a system for information exchange between interested parties includes a wireless communication network with a defined broadcast area, at least two computer devices operatively coupled to the network, the two computer devices identifying a common interest which is communicable between the two devices, and a verifier that provides electronic authentication certifying the common interest.

In one preferred embodiment, the wireless communication network is selected from the group consisting essentially of a 802.11-compliant network, Bluetooth network, cellular digital packet data (CDPD) network, high speed circuit switched data (HSCSD) network, packet data cellular (PDC-P) network, general packet radio service (GPRS) network, 1x radio transmission technology (1xRTT) network, IrDA network, multichannel multipoint distribution service (MMDS) network, local multipoint distribution service (LMDS) network, and worldwide interoperability for microwave access (WiMAX) network).

Preferably, at least one of the two computer devices is selected from the group consisting essentially of a personal computer, handheld computer, mobile phone, personal digital assistant, media center/player, music recorder/player, and/or any other like computing device.

In one preferred embodiment, the common interest is communicable over the network using an encrypted messaging protocol. In one preferred embodiment, the encrypted messaging protocol includes digital media.

Preferably, one or more computer devices include a graphical user interface for identifying the common interest. In one preferred embodiment, the one or more client devices associate the common interest with a class of user to receive the common interest. Preferably, the common interest is certified using digital certificates.

In one preferred embodiment, the one or more computer devices filter network messages for common interests using keywords. Preferably, the verifier is accessible to the two client devices through a wireless access point router.

In another aspect, a method for exchanging information between interested parties includes providing a wireless communication network within a defined broadcast area, providing at least two computer devices operatively coupled to the network, the two computer devices identifying a common interest which is communicable between the two devices, and providing electronic authentication certifying the common interest.

In one preferred embodiment, identifying the common interest includes selecting the common interest from a plurality of keywords, and associating a class-of-user with one of the plurality of keywords.

In one preferred embodiment, the method includes broadcasting the common interest over the network using a message protocol. Preferably, the messaging protocol uses encryption techniques.

In another preferred embodiment, the method includes providing a graphical user interface to one of the two computer devices for identifying the common interest. In yet another preferred embodiment, the method further includes transmitting digital media between the two computer devices.

Several benefits can be derived from the present invention. First, the system facilitates personal contact with people in a local vicinity having shared interests. The system can enable an initial interaction with people who are physically collocated with a same region but are unaware of each other.

Other objects and features of the present invention will become apparent from the following detailed description considered in conjunction with the accompanying drawings. It is to be understood, however, that the drawings are designed as an illustration only and not as a definition of the limits of the invention.

BRIEF DESCRIPTION OF THE DRAWINGS

Like reference symbols in the various drawings indicate like elements.

DETAILED DESCRIPTION OF THE PREFERRED EMBODIMENTS

Figure 1:
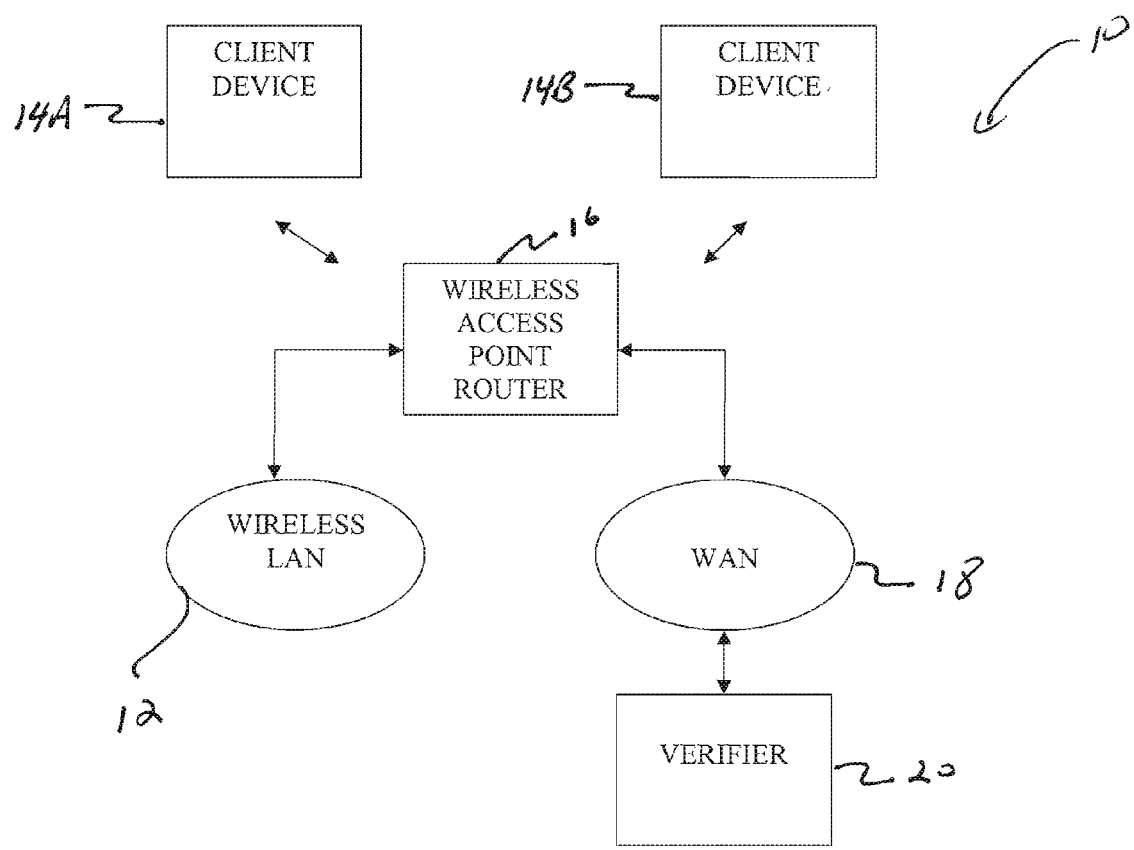
FIG. 1 is a block diagram of a wireless network system according to the present invention.

Referring now to FIG. 1, a system 10 for inter-personal communication is disclosed. The system is designed to enhance communication between users in a defined broadcast area. As used herein, the phrase "defined broadcast area" relates to an area circumscribed by the limits of a broadcasting system in which equipment provided with unique identification and verification features are able to wirelessly communicate with each other.

For example, in one preferred embodiment, the system 10 can identify users with common interests in a defined broadcast area by sending and receiving messages wirelessly between devices. In another preferred embodiment, the system can provide a list of persons or entities sharing common interests in a defined broadcast area having common interests. Interests can include, but are not limited to hobbies, sports, weather, family, products, media—films, books, magazines, etc., holidays, hometown, jobs and careers, fashion and trends, celebrity news, etc.

In one preferred embodiment, as shown in FIG. 1, the system 10 includes a wireless network 12, at least two client devices 14A, 14B operatively coupled to the wireless network 12 through a wireless access point router 16 that attaches the wireless network 12 to a wide area network 18, such as the Internet, and a verifier 20 that provides electronic authentication services certifying bona fide use of the client devices 14.

The wireless network 12 can include an 802.11-compliant network, Bluetooth network, cellular digital packet data (CDPD) network, high speed circuit switched data (HSCSD) network, packet data cellular (PDC-P) network, general packet radio service (GPRS) network, 1x radio transmission technology (1xRTT) network, IrDA network, multichannel multipoint distribution service (MMDS) network, local multipoint distribution service (LMDS) network, worldwide interoperability for microwave access (WiMAX) network, and/or any other network that communicates using a wireless protocol.

The client devices 14A, 14B shown in FIG. 1 refer to any type of personal computer device, including but not limited to personal computers, such as laptop computers, handheld computers, mobile phones, personal digital assistants, media centers/players, music recorders/players, and/or any other computing device. Although only two client devices are shown in FIG. 1, the present invention is not limited to two client devices and can include a multitude of varied client devices that are capable of communicating using a wireless protocol.

Figure 2:
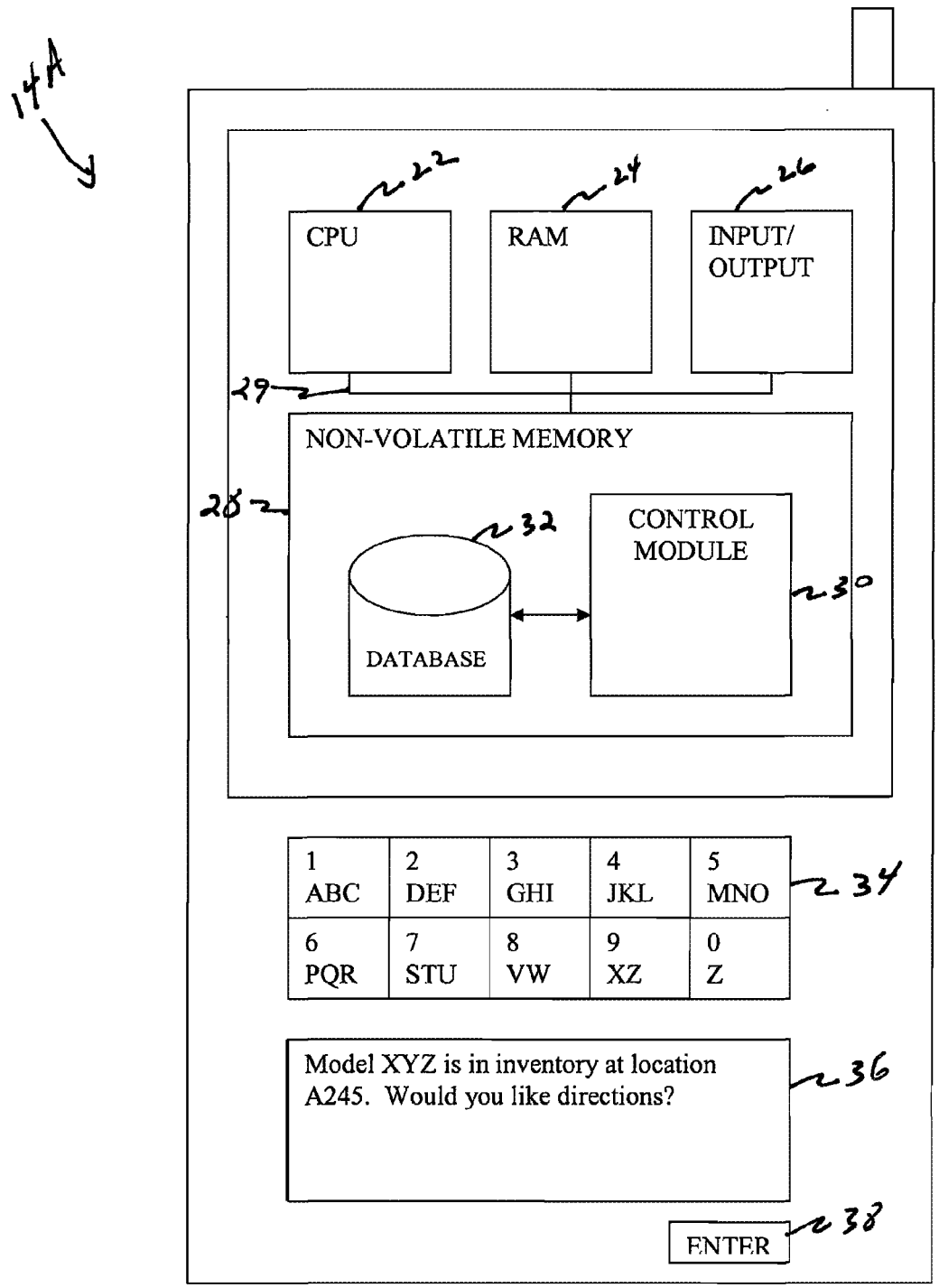
FIG. 2 is a block diagram of a client device according to the present invention.

For example, referring now to FIG. 2, in one preferred embodiment, the client device 14A is a mobile phone that includes a central processor unit (CPU) 22, random access memory (RAM) 24, an input-output control module 26, and non-volatile memory 28, all of which are interconnected via a bus line 29 and controlled by the CPU 22. As shown in the FIG. 2 example, the non-volatile memory 28 of the device 14A preferably is configured to include a communication module 30 and a database 32 that operate to send and receive messages over the network 12.

The client device 14A preferably includes a display screen 36 that can be used to display and identify areas of common interest among users, data entry keys 34 for defining areas of interest to the user, and an enter key 38 for storing user specified interests and for transmitting information to users. Preferably, the display screen 36, data entry keys 34, and enter key 38 operate under the control of the input-output module 26.

The database 32 provides storage for one or more data items representative of a user's identity and interests. In one preferred embodiment, referring to FIG. 1, the database 32 is a relational database that includes strong cryptography to secure user identity information, such as name, address, age, credit card information, banking information, and interest information, as described previously. In another preferred embodiment, the database 32 is a directory server, such as a Lightweight Directory Access Protocol (LDAP) server, that can provide storage for user identity and interest information remotely off the device. In other embodiments, the database 32 is a configured area in memory of the device that can store the user identity and interest information.

The control module 30 of the present invention provides select communication between client devices 14A, 14B of the network 12 and allows the user to establish a user profile including information for sharing with other client devices.

Figure 3:
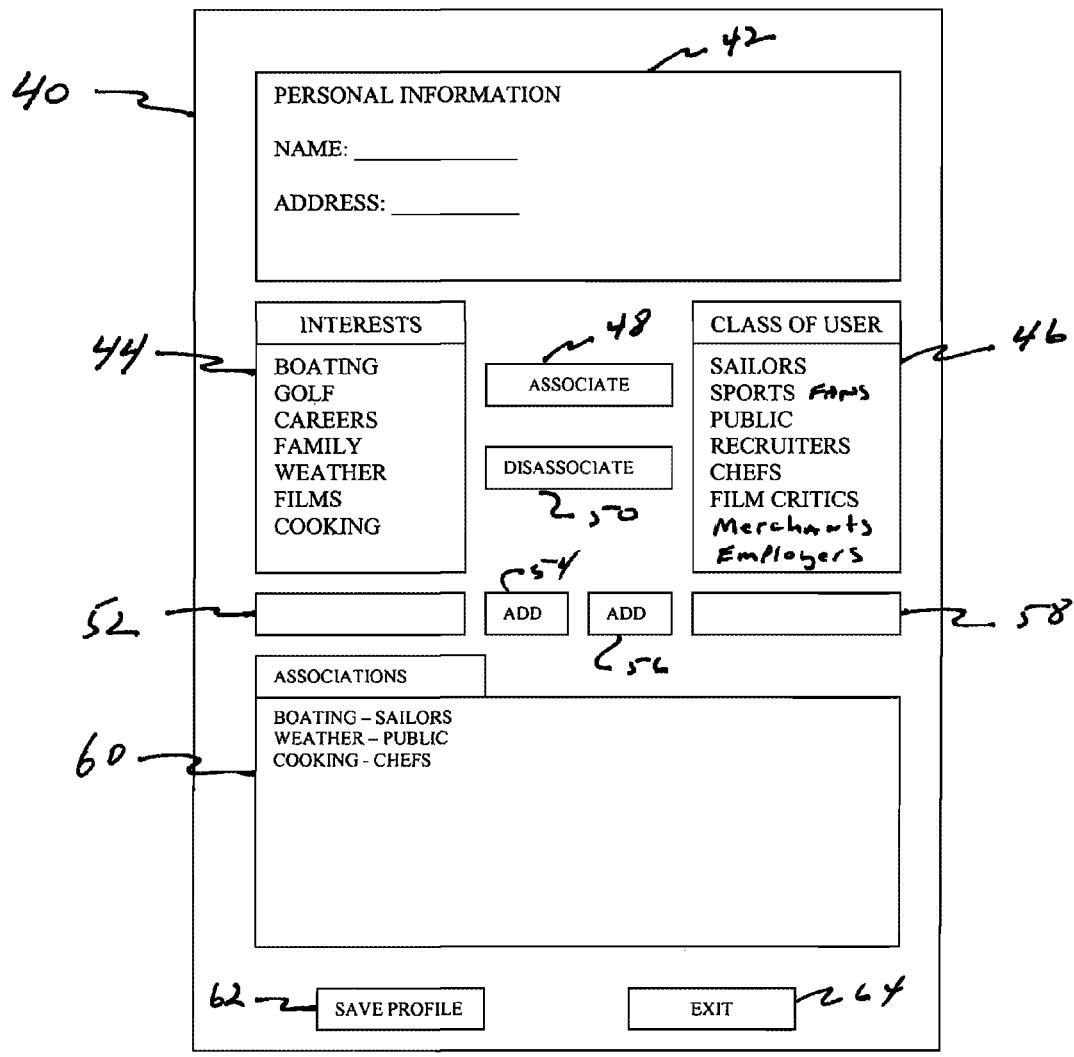
FIG. 3 is an example graphical user interface for establishing a profile.

Referring now to FIGS. 2 and 3, an example graphical user interface 40 provided by the control module 30 is shown. In one preferred embodiment, the control module 30 displays the user interface 40 on the screen 36 of the client device 14A with personal information 42, such as name and contact information, and prompts the user to select user interests/keywords 44 for transmission to other device users. In another preferred embodiment, the control module 30 displays the graphical user interface on a Personal Computer (PC) attached to the client device 14A.

In one preferred embodiment, as shown in FIG. 3, the graphical user interface 40 of the present invention includes a personal information area 42, an interest list 44 with interest entry area 52, a class-of-user list 46 and class-of-user entry area 58, and an association list 60.

The interest list 44 provides a listing of selectable predefined interests/keywords that are user selectable and available for transmission to other device users. In one preferred embodiment, interests/keywords can include, but are not limited to hobbies, sports, weather, family, products, media—films, books, magazines, etc., holidays, hometown, jobs and careers, fashion and trends, etc. and are identified by keywords. In the event an interest/keyword is not included in the interest list 44, interest entry area 52 provides a data entry area for entering an interest/keyword which, upon selection of add button 54, is stored by the control module 30 to the database 32.

Once an interest is selected, in one preferred embodiment, the control module 30 then prompts the user to select a class-of-user to transmit the interest/keyword to. For example, as shown in the FIG. 3 example, in one preferred embodiment, the class-of-user can include employers, merchants, public, recruiters, hobbyists, sports fans, and the like. Similar to the interest entry area 52, in the event a particular class-of-user is not provided in the class-of-user list 46, the class-of-user entry area 58 provides a data entry area for entering a new class-of-user which, upon selection of add button 56 by the user, is stored by the control module 30 to the database 32.

Once the user selects an interest/keyword and class-of-user, the user can select an associate button 48 which causes the control module 30 to associate the selected user interest/keyword with the selected class-of-user and display the association in the association list 60. Likewise, the user can select an interest/keyword and class-of-user association from the association list 60 and select a disassociate button 50 which disassociates the interest/keyword class-of-user pair and removes the same from the association list 60. Upon selection of the save-profile button 62, the control module 30 stores the associations displayed in the association list 60 to a user profile (not shown) to the database 32. Each user profile can include a plurality of associations between user interests/keywords and classes of users.

Personal user information, such as name, address, as well as account information (not shown), can also be entered and stored by the control module 30 in the user profile using personal information area 42 upon selection of save-profile button 62. Upon a user selecting exit button 64, the control module 30 terminates display of the graphical user interface 40.

Figure 4:
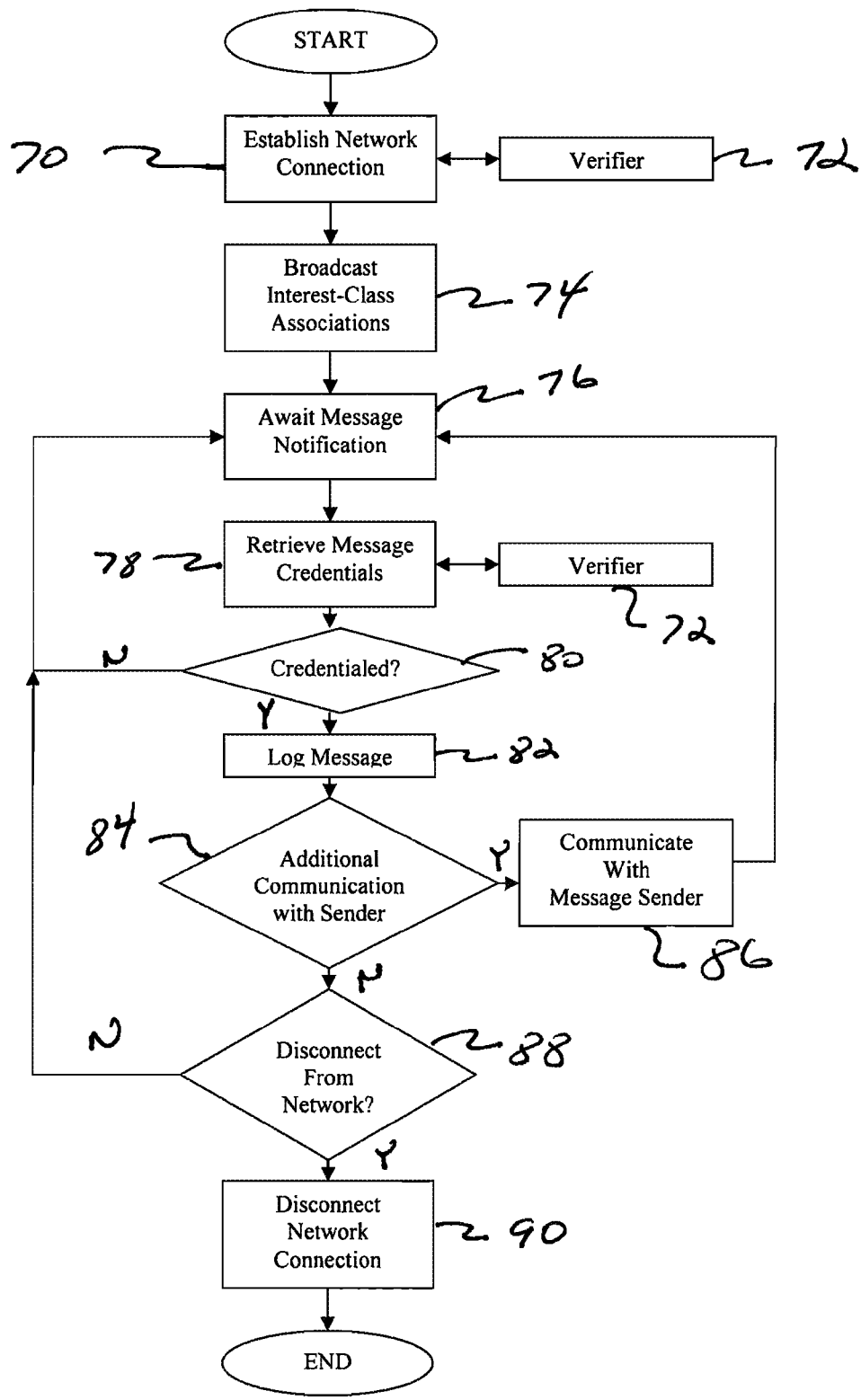
FIG. 4 is a flow chart of a method for communicating information between client devices.

Referring now to FIG. 4, a method executed by the control module 30 to communicate information between client devices 14A, 14B is disclosed. As shown in FIG. 4, in one preferred embodiment, the communication module 30 first seeks to establish a connection 70 to the network 12 by establishing a bidirectional communication link with the wireless router 16. Preferably, the router 16 requires a key, as known in the art, (e.g. WEP key, etc.) to authenticate the client device before the router 16 grants network 12 access to the client device.

For example, in one preferred embodiment, the control module 30 of the device seeking access to the network 12 requests a certificate from the verifier 20, which is a trusted third party that establishes the identity of device users. Next, the verifier 20 establishes the user's identity using techniques known in the art. The verifier 20 then issues a certificate that contains the network's public key and signs it with the verifier's private key 72. The control module 30 then provides the certificate to the router 16 which, upon verification of the certificate, grants network access to the client device.

In one preferred embodiment, as shown in FIG. 1, the verifier 20 is accessible to the client device through the WAN 18 which is accessible through the router 16. In another preferred embodiment, certificates have been previously downloaded from the verifier 20 and are stored in the client database 32. The control module 30 provides these stored certificates to the router 16 for verification prior to being granted access to the network 12. Preferably, if no mechanism exists on the network 12 to identify or authenticate the client device attempting to establish network access, the router 16 denies access.

As shown in FIG. 4, once the control module 30 establishes network connectivity, the control module 30 broadcasts messages containing interest/keyword class-of-user associations 74 on the network 12. The interest/keyword class-of-user associations can reveal different types of information to different types of people. For example, interest/keyword class-of-user associations can relate to items being sought, items being sold, job opportunities, etc. In one preferred embodiment, the control module 30 broadcasts the interest/keyword class-of-user associations on the network 12 at preset time intervals. In another preferred embodiment, messages containing interest/keyword class-of-user associations are broadcast by the user on an as requested basis.

Preferably, as shown in FIG. 4, once the control module 30 broadcasts the interest/keyword class-of-user associations, the client device awaits message notification from other client devices that are broadcasting similar class-of-user associations 76. In one preferred embodiment, the control module 30 adapts the client device to listen passively on the network 12 for similar messages by filtering network messages based on interest/keyword class-of-user associations. In another preferred embodiment, the control module 30 adapts the client device to actively search the network 12 for broadcast messages that contain similar interest/keyword class-of-user associations defined for the user.

Once a message is received from another client device broadcasting similar interest/keyword class-of-user associations, in one preferred embodiment, the control module 30 retrieves 78 and verifies the validity of the received interest/keyword class-of-user association 78 using the verifier 72 (i.e., using certificates). If the message containing the interest/keyword class-of-user association is not credentialed 80, the control module 30 awaits additional message notifications 76.

If the message containing the interest/keyword class-of-user association is credentialed 80, the control module 30 stores the message received in a log file 82, which can be made accessible to the user in real-time or off-line for subsequent follow-up, and prompts the user of the client device to indicate whether additional communication with the message sender should be initiated 84.

For example, in one preferred embodiment, the control module 30 prompts the client device user via a pop-up window on the screen 36 to indicate whether additional communication with the sender of the message is desired. The pop-up window can include information retrieved from the message including digital media, such as a photograph of the message sender, a location of the message sender, as well as other descriptive sender information. The client device user may respond and indicate his/her willingness or non-willingness to further the communication with the sender.

If the client device user does not wish to further the communication with the sender, the control module 30 prompts the client device user to indicate whether he/she wishes to be disconnected from the network 88. If the client device user does not wish to be disconnected from the network, the control module 30 awaits additional messages notifications 76. Otherwise, if the client device user wishes to be disconnected from the network, the control module 30 terminates the network connection 90.

If the client device user wishes further communications with the message sender, in one preferred embodiment, the control module 30 establishes a Transport Layer Security (TLS) session between the message sending device and the client device over the wireless network 12. Preferably, the TLS protocol provides a mechanism for (1) the generation and exchange of information which is used to ensure the identity of the sending and receiving devices, and (2) the secure exchange of security information (in one embodiment, cryptographic keys such as WEP/WPA keys, passphrase, etc.) between the two devices. Of course, it will be appreciated by one skilled in the art that other protocols can be used for the exchange of information between devices.

A number of embodiments of the invention have been described. Nevertheless, it will be understood that various modifications may be made without departing from the spirit and scope of the invention. For example, dedicated servers or virtual servers, collectively remote servers, may provide remote desktops and be organized or contained in various ways, and reside on multiple computers. Also, the steps described above may be modified in various ways or performed in a different order than described above, where appropriate. Accordingly, alternative embodiments are within the scope of the following claims.

What is claimed is:

1. A system for information exchange between interested parties comprising:
    a wireless communication network within a broadcast area;
    a plurality of mobile computer devices within the broadcast area operatively coupled to the wireless communication network,
    a verifier configured and operative to establish the identity of users of the plurality of mobile computer devices in the broadcast area, and to issue a certificate for each of the plurality of mobile computer devices,
    a first one of the mobile computer devices configured and operative to broadcast a first message containing a first keyword/class-of-user association to the plurality of mobile computer devices within the broadcast area, and a second one of the mobile computer devices configured and operative to receive the first message containing the first keyword/class-of-user association broadcast within the defined broadcast area from the first one of the mobile computer devices and to compare the first keyword/class-of-user association contained in the first message with a second keyword/class-of-user association maintained by the second one of the mobile computer devices to determine whether a common interest exists, wherein the second one of the mobile computer devices is configured and operative to retrieve the certificate issued for the first one of the mobile computer devices in response to determining the common interest exists and verifies the validity of the first keyword/class-of- user association contained in the first message using the certificate to provide electronic authentication certifying the common interest.

2. The system of claim 1, wherein the wireless communication network is selected from the group consisting essentially of a 802.11-compliant network, Bluetooth network, cellular digital packet data (CDPD) network, high speed circuit switched data (HSCSD) network, packet data cellular (PDC-P) network, general packet radio service (GPRS) network, 1x radio transmission technology (1xRTT) network, IrDA network, multichannel multipoint distribution service (MMDS) network, local multipoint distribution service (LMDS) network, and worldwide interoperability for microwave access (WiMAX) network).

3. The system of claim 1, wherein at least one of the mobile computer devices is selected from the group consisting essentially of a handheld computer, mobile phone, personal digital assistant, media center/player, and music recorder/player.

4. The system of claim 1, wherein the common interest is communicable over the network using an encrypted messaging protocol.

5. The system of claim 4, wherein the encrypted messaging protocol includes digital media.

6. The system of claim 1, wherein at least one of the mobile computer devices includes a graphical user interface for identifying the common interest.

7. The system of claim 6, wherein the at least of the mobile computer devices associates the common interest with a class-of-user to receive the common interest.

8. The system of claim 7, wherein the common interest is certified using digital certificates.

9. The system of claim 1, wherein at least one of the mobile computer devices filters network messages for common interests.

10. The system of claim 9, wherein the verifier is accessible to the mobile computer devices through a wireless access point router.

11. The system of claim 1, wherein the first keyword/class-of-user association indicates a relationship between a first keyword, selected by a user of the first computer device from a first list of keywords, the first keyword describing a topic of interest to the user, and a first class-of-user classification, selected by the user from a second list of classifications, the first class-of-user classification identifying subsets of individuals having interest the topics described by the keywords on the first list of keywords, and the second keyword/class-of-user association indicating a relationship between a second keyword describing a topic of interest to the user of the second computer device, and a second class-of-user classification identifying a subset of individuals having interest in the topic described by the second keyword.

12. A method for exchanging information between interested parties comprising:

identifying a plurality of mobile computer devices operatively coupled to a wireless communications network within a predetermined broadcast area, broadcasting by a first one of the mobile computer devices a first message containing a first keyword/class-of-user association to the plurality of mobile computer devices within the defined broadcast area, receiving by a second one of the mobile computer devices the first message containing the first keyword/class-of-user association broadcast within the defined broadcast area from the first one of mobile computer devices, and comparing the first keyword/class-of-user association contained in the first message with a second keyword/class-of-user association maintained by the second one of the mobile computer devices to determine whether a common interest exists;

establishing identities of users of the plurality of mobile computer devices in the defined broadcast area using a verifier; and issuing a certificate for each of the plurality of mobile computer devices, wherein the second one of the mobile computer devices retrieves the certificate issued for the first one of the mobile computer devices in response to determining the common interest exists and verifies the validity of the first keyword/class-of-user association contained in the first message using the certificate to provide electronic authentication certifying the common interest.

13. The method of claim 12, wherein identifying the common interest comprises:

selecting the common interest from a plurality of keywords; and associating a class-of-user with one of the plurality of keywords.

14. The method of claim 12, further comprising broadcasting the common interest over the network using an encrypted messaging protocol.

15. The method of claim 14, further comprising transmitting digital media between the mobile computer devices.

16. The method of claim 15, further comprising providing a graphical user interface to one of the mobile computer devices for identifying the common interest.

17. The method of claim 12, wherein the first keyword/class-of-user association indicates a relationship between a first keyword, selected by a user of the first computer device from a first list of keywords, the first keyword describing a topic of interest to the user, and a first class-of-user classification, selected by the user from a second list of classifications, the first class-of-user classification identifying subsets of individuals having interest the topics described by the keywords on the first list of keywords, and the second keyword/class-of-user association indicates a relationship between a second keyword describing a topic of interest to the user of the second computer device, and a second class-of-user classification identifying a subset of individuals having interest in the topic described by the second keyword.

* * * * *